(12) United States Patent
Kronhaus

(10) Patent No.: US 11,505,336 B2
(45) Date of Patent: Nov. 22, 2022

(54) INLINE SCREW FEEDING VACUUM ARC THRUSTER

(71) Applicant: TECHNION RESEARCH AND DEVELOPMENT FOUNDATION LIMITED, Haifa (IL)

(72) Inventor: Igal Kronhaus, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 780 days.

(21) Appl. No.: 16/310,175

(22) PCT Filed: Jun. 15, 2017

(86) PCT No.: PCT/IL2017/050670
§ 371 (c)(1),
(2) Date: Dec. 14, 2018

(87) PCT Pub. No.: WO2017/216802
PCT Pub. Date: Dec. 21, 2017

(65) Prior Publication Data
US 2019/0329911 A1 Oct. 31, 2019

(30) Foreign Application Priority Data

Jun. 15, 2016 (IL) .......................................... 246250

(51) Int. Cl.
*B64G 1/40* (2006.01)
*F03H 1/00* (2006.01)

(52) U.S. Cl.
CPC ............. *B64G 1/40* (2013.01); *F03H 1/0012* (2013.01); *F03H 1/0087* (2013.01)

(58) Field of Classification Search
CPC .... F03H 1/0081; F03H 1/0087; F03H 1/0093; F03H 1/0012; F03H 1/00; F03H 1/0006; B64G 1/406; B64G 1/405; B64G 1/40
See application file for complete search history.

(56) References Cited

U.S. PATENT DOCUMENTS 3,622,735 A * 11/1971 Mainwaring ............ B23H 9/14
219/69.15
4,800,716 A 1/1989 Smith et al.
(Continued)

FOREIGN PATENT DOCUMENTS

| CN | 101699928 A | 4/2010 |
| JP | H0968154 A | 3/1997 |
| WO | 2014127325 A | 8/2014 |

OTHER PUBLICATIONS

"MicroVacuum Arc Thruster Design for a CubeSat Class Satellite" by Filip Rysanek and John W. Hartmann Proceedings of the AIAA/USU Conference on Small Satellites, 16 Annual conference in 2002, SSc02-1-2, "https://digitalcommons.usu.edu/smallsat/2002/all2002/2/" (7 pages).

(Continued)

*Primary Examiner* — Arun Goyal
*Assistant Examiner* — William L Breazeal
(74) *Attorney, Agent, or Firm* — Roach Brown McCarthy & Gruber, P.C.; Kevin D. McCarthy

(57) ABSTRACT

A vacuum arc thruster device having a cathode rod disposed within a concentric insulator tube, and an anode electrode located at the distal edge of the insulator tube, separated from the cathode rod by the insulator tube. A controlled feeding mechanism moves the cathode towards the distal exit plane in a helical motion, the cathode rotating as it moves forward. The cathode rod is fixed in the center of a headless screw segment, which is rotated within a screw thread on the internal surface of a cylindrical wall of the (Continued)

device. As the erosion rate is concentrated at the exit plane, the screw action path enables uniform erosion around the cathode circumference, and cathode linear motion that can be matched to the radial erosion rate. The feeding rate and hence the thrust are proportional to the input power, which can be regulated by the pulse frequency.

20 Claims, 3 Drawing Sheets

(56) References Cited

U.S. PATENT DOCUMENTS

| | | | |
|---|---|---|---|
| 4,866,929 A | | 9/1989 | Knowles et al. |
| 5,879,518 A | * | 3/1999 | Kuehnle ............... B22F 9/14 204/164 |
| 6,145,298 A | | 11/2000 | Burton |
| 6,153,976 A | | 11/2000 | Spanjers |
| 6,777,862 B2 | | 8/2004 | Fisch et al. |
| 6,818,853 B1 | | 11/2004 | Schein et al. |
| 8,875,485 B2 | | 11/2014 | Keidar et al. |
| 2010/0058734 A1 | | 3/2010 | Stein et al. |
| 2011/0258981 A1 | | 10/2011 | Keidar et al. |
| 2016/0273524 A1 | * | 9/2016 | Keidar ............... B64G 1/405 |

OTHER PUBLICATIONS

Database Compendex [online] Engineering Information, Inc., New York, NY, US; 2017, Kronhaus I et al: "Long duration vacuum arc thruster for nanosatellite propulsion", 57th Israel Annual Conference on Aerospace Sciences ISR, Mar. 15, 2017 (1 page).
European Search Report and Opinion for EP 17812893.0, dated Dec. 20, 2019 (3 pages).
European Decision to Grant for EP1781289.0, dated Nov. 20, 2020 (27 pages).
Translation of Israel Office Action for IL 246250, dated Mar. 9, 2017 (2 pages).
International Search Report for PCT/IL2017/050670, dated Sep. 27, 2017 (3 pages).
Written Opinion of the International Searching Authority for PCT/IL2017/050670, dated Sep. 27, 2017 (4 pages).
Israel Office Action for IL 246250, dated Mar. 9, 2017 (4 pages) and Translation of Israel Office Action for IL 246250, dated Mar. 9, 2017 (2 pages).
Translation of the Chinese Office Action for CN patent application No. 201780044301.6 dated Nov. 26, 2021 (9 pages).

* cited by examiner

INLINE SCREW FEEDING VACUUM ARC THRUSTER

FIELD OF THE INVENTION

The present invention relates to the field of vacuum arc thrusters providing low thrust rocket propulsion, especially for use in trajectory correction of satellites.

BACKGROUND

Vacuum arc thrusters (VAT) are small low-power electric rocket propulsion devices that provide thrust capabilities to spacecraft. Important uses include: the main propulsion for nanosatellites, generally defined as those with a mass of less than 10 kg., and fine attitude control, orbital formation maintenance, and drag compensation for larger spacecraft. A typical VAT is comprised of an anode, an insulator, and a cathode. The VAT works in a manner similar to a spark plug, with an electric arc being created from anode to cathode. A combination of Joule heating and ion bombardment heating sustains the temperatures required to emit electrons and vaporize cathode material. This interaction between electric arc and cathode results in cathode material being ejected from its surface at high velocity. This produces an efficient, low-power and compact means of propulsion. The cathode thus functions as a solid propellant and is consumed during operation. A low voltage power supply, advantageously an inductive power supply, provides for the generation of an arc that emanates from a cathodic spot. In the cathodic spot, cathode material is vaporized, ionized, and accelerates as plasma by strong pressure gradients. One example of such a VAT with its power supply is shown in U.S. Pat. No. 6,818,853 for "Vacuum Arc Plasma Thrusters with Inductive Energy Storage Driver" to J. Schein et al. However, due to erosion of the cathode with time, the process is eventually interrupted. Hence the life time of conventional VAT's is restricted and its application as a spacecraft thruster is therefore limited.

As a solution for improving the VAT life time, a magnetically enhanced micro-cathode thruster (MCT) has been described in U.S. Pat. No. 8,875,485, for "Micro-Cathode Thruster and a Method of Increasing Thrust Output for a Micro-Cathode Thruster" to M. Keidar et al. However, in order for the MCT to operate efficiently, it requires a strong magnetic field of the order of 0.1-0.3 T, and such a high magnetic field does not only involve a significant mass and volume addition, but can also interfere with onboard magnetic sensors, and induce a significant magnetic torque disturbance. Both effects affect small and compact spacecraft, such as nanosatellites especially adversely. Additionally, the MCT feeding mechanism is based on a compression spring that pushes the cathode against a surface, and is completely dependent on the cathode erosion profile. The uncontrolled coupling between the linear advance of the cathode and the chaotically or randomly established erosion profile can cause the feeding mechanism to jam.

There therefore exists a need for a reliable, non-magnetic, light-weight VAT, having a long operating life, to overcome some of the disadvantages of prior art VAT's.

The disclosures of each of the publications mentioned in this section and in other sections of the specification are hereby incorporated by reference, each in its entirety.

SUMMARY

The present disclosure describes new exemplary systems for a VAT having a central cathode rod freely disposed within a concentric insulator tube, and an anode electrode located at the outer distal edge of the insulator tube, separated from the distal end of the cathode rod by the width of the wall of the insulator tube. A controlled feeding mechanism moves the cathode towards the distal exit plane in a helical motion, in which it is rotated as it moves linearly towards the exit plane, where it is eroded by the vacuum arc discharge. This mechanism is called in this disclosure, an inline screw-feeding vacuum arc thruster (ISF-VAT). The screw feeding mechanism can be advantageously and simply implemented by fixing the cathode rod in the center of a headless screw segment, which is rotated within a screw thread on the internal surface of a cylindrical outer wall of the device. However, it is to be understood that the use of a mechanical screw thread feed is only one method by which the helical motion of the cathode can be achieved, but since it may be considered to be the simplest method, the ISF nomenclature is used throughout this disclosure to represent any screw-like helical motion of the cathode, whether actuated by a real screw mechanism or by another helical motion generator. For this ISF-VAT geometry the cathode erosion process is primarily located on the outer surface of the cathode next to the longitudinally outer distal edge of the insulator tube, where material is removed from the cathode tip, reducing its diameter, while also reducing its protruding length as it moves forward, the slightly protruding end of the cathode being completely eroded by this process. This screw-like action path allows:

1) cathode rotation that enables uniform erosion around the cathode circumference; and
2) cathode linear motion that can be matched to the erosion rate, which itself is determined by the input power by selecting the pulse frequency.

With a fixed forward motion per revolution, this being the screw pitch for the exemplary case of a mechanical screw drive, the linear motion of the cathode is regulated by the rotation rate of the screw. At a predetermined rate, complete erosion of the cathode's tip can be achieved within the insulator. The mechanism, therefore, allows for a given geometry full utilization of the propellant mass, i.e. the cathode material, while providing continuous and reliable feeding, since no excess cathode material is left after the ejection process to jam the feed mechanism. Furthermore, uniform re-coating of the cathode-insulator-anode interface is achieved, which is important for maintaining reliable discharge ignitions over a large number of pulses.

The in-line feeding of the cathode, forces the arc to emerge on the tip of the cathode at the exit plane of the ISF-VAT. Therefore the plasma accelerates away from the thruster and creates thrust efficiently without a need for a magnetic system. The ISF-VAT feeding mechanism is controlled and therefore offers reliable operation over a large number of pulses. Moreover, since the feeding rate is proportional to the input power, the thrust can be controlled by selecting an appropriate pulse frequency.

Other methods of providing the helical screw-like motion of the cathode can include the use of piezoelectric drives attached to the cathode supporting structure, both linear and rotational drives being needed. Linear and rotary stepping or electro-mechanical motors can also be envisaged for providing the helical screw-like motion to the cathode rod. However, there is a difference between these implementations and that of the mechanical screw helical motion generator. In the latter case, there is a correlation between the rotational and the linear motion, since it is the rotational motion which generates the linear motion. Therefore, the rotational motion speed must be carefully controlled to match the erosion rate, so that the cathode does not move out of the thruster more rapidly than the rate at which it is being eroded. Since the erosion rate depends on the input power, as determined by the pulse frequency, there needs to be a correlation between the rotation speed and the power input.

With the separate linear and rotational motors, however, whether piezoelectric, stepping or electromechanical, or a combination thereof, there is no need for any correlation between the linear advance and the rotary motion. The forward feed is determined only by the linear motor, and that has to be correlated with the power input, in order to ensure correct rate of advance for the erosion rate. The rotation speed, on the other hand, can be as fast or slow as is preferred, so long as speed is sufficient to provide uniform erosion of the cathode tip, and not so fast as to waste energy in providing excessive and hence unnecessary rotation speed.

There is thus provided in accordance with an exemplary implementation of the devices described in this disclosure, a vacuum arc thruster assembly comprising:
(i) a housing having an anode at its distal end, insulated from the housing,
(ii) an axial tubular insulator attached concentrically at the central region of the anode with its distal end essentially flush with the anode distal surface, the insulator having an axial opening,
(iii) a rod shaped cathode disposed within the opening of the tubular insulator, such that it is free to move axially and rotationally within the opening, and
(iv) at least one mechanism adapted to generate rotational and axial motion to the cathode rod, such that it rotates and moves distally within the tubular insulator.

In such a vacuum arc thruster assembly, the housing may have an internal thread, with the cathode rod fixed coaxially into a screw segment having an outer thread matching the internal thread of the housing, such that rotation of the screw segment causes the cathode rod to rotate and to move distally within the tubular insulator. In such a situation, the at least one mechanism adapted to generate rotational and axial motion to the cathode rod comprises a rotational motor generating rotational motion by direct rotation, and axial motion by rotation of the screw segment.

As an alternative, in the above described vacuum arc thruster assembly, the at least one mechanism adapted to generate rotational and axial motion to the cathode rod may comprise a rotational motor and a linear motor. Any of these motors can be a piezoelectric, a stepping or an electromechanical motor.

Furthermore, in any of the above described vacuum arc thruster assemblies incorporating a screw segment, the screw segment may have at least one off-axis longitudinal opening, the vacuum arc thruster assembly further comprising a shaft assembly with at least one rod positioned off-axis such that it fits freely into the at least one off-axis longitudinal opening, such that rotation of the shaft assembly rotates the screw segment by rotation of the at least one rod.

According to additional exemplary implementations of such screw segment thruster assemblies, the rotation of the screw segment may be provided by a power spring. Additionally, the thrusters may further comprise a brake assembly for preventing rotation of the screw segment, ad such a brake assembly may be actuated by either of a piezoelectric actuator and an electromechanical actuator. The rotation of the screw segment may be provided by either an electromechanical motor, or a piezoelectric motor, or a stepping motor.

In any of the above described thrusters, the insulator may comprise a conductive film forming an anode-insulator-cathode interface. The conductive film may be a metal or carbon.

Furthermore, a voltage may be applied between the anode and the cathode rod by a power unit comprising a voltage source, an inductor connected to the voltage source, and a switch connected to the voltage source and the inductor. This voltage may be applied between the anode and the cathode rod in pulses having an adjustable pulse frequency and an adjustable level, such that the power input to the vacuum arc thruster can be adjusted.

According to additional implementations of the above described screw segment implementations of these vacuum arc thruster assemblies, the pitch of the threads may be selected such that for a predetermined rate of rotation of the screw segment, and a predetermined power input, the cathode rod moves distally within the tubular insulator at substantially the same rate as the tip of the cathode is eroded. Additionally, for a given pitch of the threads, the power input and the rate of rotation of the cathode rod should be correlated such that the cathode rod moves distally within the tubular insulator substantially at the same rate as the tip of the cathode is eroded.

There is further provided according to yet another implementation of the vacuum arc thruster assemblies of the present disclosure, an assembly comprising:
(i) a housing having an internal thread, the housing having an anode end plate at its distal end, the anode end plate being insulated from the housing,
(ii) an axial tubular insulator attached concentrically at the central region of the anode with its distal end essentially flush with the anode end plate, the insulator having an axial opening,
(iii) a rod shaped cathode disposed within the opening of the tubular insulator, such that it is free to move axially and rotationally within the opening,
(iv) a screw segment into which the cathode rod is fixed coaxially, the screw segment having an outer thread matching the internal thread of the housing, and
(v) a rotation mechanism adapted to rotate the screw segment, wherein rotation of the screw segment causes the cathode rod to rotate and to move distally within the tubular insulator.

In such an assembly, the screw segment may have at least one off-axis longitudinal opening, the vacuum arc thruster assembly further comprising a shaft assembly with at least one rod positioned off-axis such that it fits freely into the at least one off-axis longitudinal opening, the shaft assembly being attached to the rotation mechanism, such that the rotation mechanism rotates the screw segment by rotation of the at least one rod. Additionally, the rotation mechanism may be a power spring, an electromechanical motor or a piezoelectric motor. If the rotation mechanism is a power spring, the assembly should also comprise a brake assembly for preventing rotation of the rotation mechanism. The brake assembly may be actuated by a piezoelectric actuator or by an electromechanical actuator.

In any of the vacuum thrust assemblies of this other implementation, the insulator may comprise a conductive film forming an anode-insulator-cathode interface. The film may be a metal or carbon. Additionally, a voltage may be applied between the anode and the cathode rod by a power unit comprising a voltage source, an inductor connected to the voltage source, and a switch connected to the voltage source and the inductor. This voltage may be applied between the anode and the cathode rod in pulses having an adjustable pulse frequency and an adjustable level, such that the power input to the vacuum arc thruster can be adjusted. In that case, the pitch of the threads may be selected such that for a predetermined rate of rotation of the screw segment, and a predetermined power input, the cathode rod moves distally within the tubular insulator at substantially the same rate as the tip of the cathode is eroded. Alternatively, for a given pitch of the threads, the rate of rotation of the screw segment and the power input are correlated such that the cathode rod moves distally within the tubular insulator substantially at the same rate as the tip of the cathode is eroded.

Throughout this disclosure, the terms distal, with respect to the ISF-VAT structure, is intended to mean the direction away from the base of the device, i.e. in the direction of the exit plane, which is also the direction in which the plasma plume of the discharge is emitted from the exit plane.

Furthermore, the insulator is described as being tubular, where the term tubular is not intended to be limited to a tube having a circular cross section. Since the tubular insulator does not need to rotate but is fixed within the device housing, it can have any suitable outer profile shape, whether circular, rectangular, square, or any other suitable shape.

BRIEF DESCRIPTION OF THE DRAWINGS

The present invention will be understood and appreciated more fully from the following detailed description, taken in conjunction with the drawings in which:

FIG. 6a shows the cathode electrode in its operating position, and FIG. 6b showing the cathode intentionally pulled out of the discharge plane to show the erosion pattern of the cathode tip.

DETAILED DESCRIPTION

Figure 1:
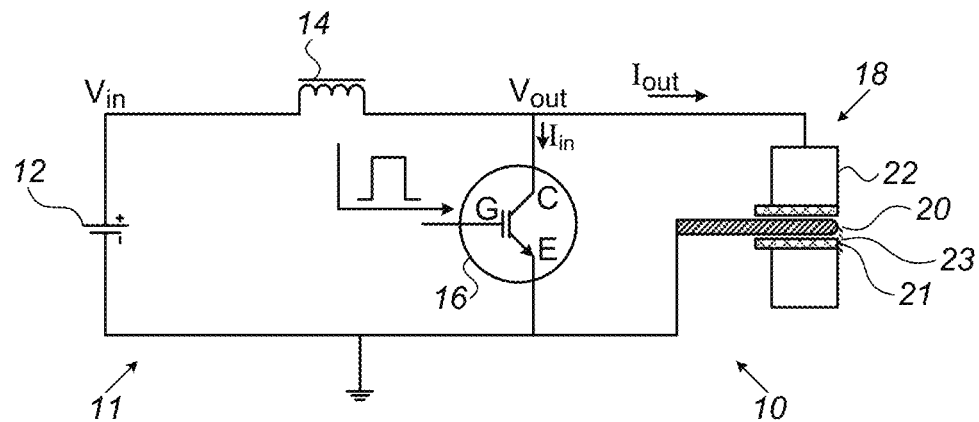
FIG. 1 illustrates schematically an exemplary ISF-VAT of the present disclosure, including its connected power supply, termed also as a power processing unit.

Reference is now made to FIG. 1, which illustrates schematically an exemplary ISF-VAT 10 according to an implementation of the devices of the present disclosure, including a power processing unit (PPU) 11 connected to the ISF-VAT assembly 18. The PPU 11 is similar to that shown in U.S. Pat. No. 6,818,853, and includes a voltage source 12 that provides the input voltage Vin, such as a capacitor, battery or solar cells, or the like, an energy storage inductor 14 and a solid state switch 16. Solid state switch 16 is typically an insulated-gate bipolar transistor (IGBT) or a metal-oxide-semiconductor field-effect transistor (MOSFET), although other solid state switches can be used instead. A pulse width modulated (PWM) voltage signal is used to modulate the solid state switch. When the switch 16 is closed, it acts as an electrical short and the voltage source provides a current Iin to the inductor 14. The current to the inductor increases until saturation. Once switch 16 is opened, due to the sudden and large change in current through the inductor 14, it generates a high output voltage Vout to the ISF-VAT 18 to achieve breakdown of the insulator 21. The inductor 14 can be an inductor known in the art, suitable for the described intended use. For example, the energy storage inductor 14 can be an iron or ferrite core inductor, an air core inductor, or a magnetic inductor. To lower the ignition voltage needed to cause breakdown, the insulator 21 is coated with a conducting layer 23, as is known in the art. After breakdown an arc discharge develops at the exit plane of the ISF-VAT between the cathode 20 and the anode 22.

Figure 2:
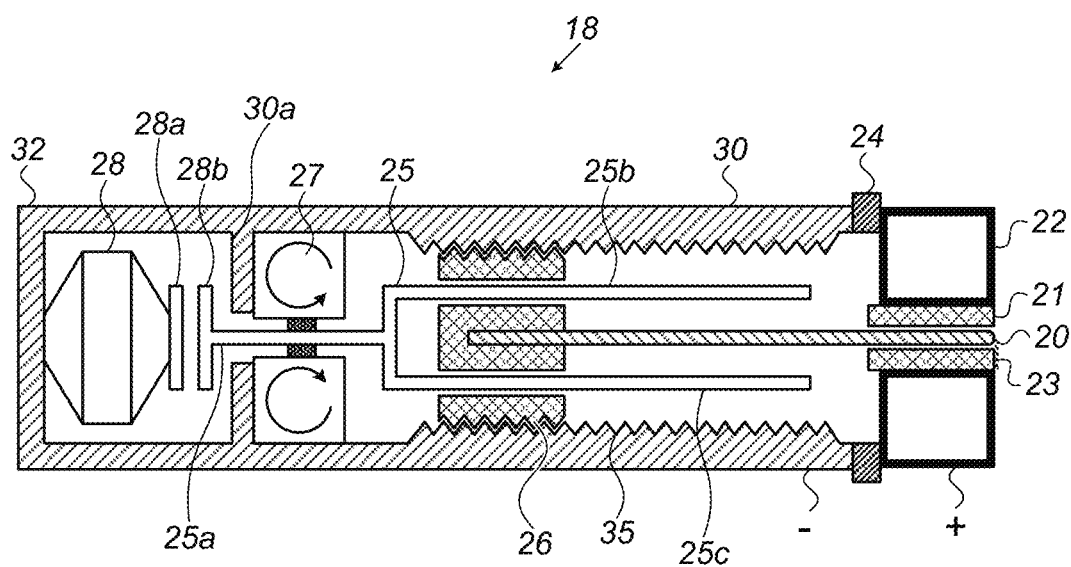
FIG. 2 shows a cut-away cross sectional view of an exemplary implementation of the ISF-VAT's of the present disclosure.

Reference is now made to FIG. 2, which shows a cut-away cross sectional view of an exemplary implementation of the ISF-VAT of the present disclosure, using a screw structure as the mechanism for providing the helical motion for the cathode rod. FIG. 2 illustrates the main distinction of the presently described ISF-VAT from those of the prior art. The present exemplary device shown in FIG. 2 has a coaxial design, comprising a small diameter cathode rod 20, of the order of 1 mm in diameter. The cathode 20 is made of a conducting material with intermediate to low thermal expansion coefficient, such as titanium, iron, molybdenum, tantalum, or the like. The most advantageous material is titanium. These types of metals provide good recoating capability for replenishing the conducting layer while restricting thermal deformation that may block the orifice and jam the system. The cathode rod 20, can be either circularly cylindrical, or having any other cross sectional shape, such as rectangular, the latter shape facilitating its fixation in the rotating screw, which will be described hereinbelow.

The cathode is inserted inside a tubular insulator 21. The tubular insulator housing 21 is preferably configured as a tube with a circular cross section and made from an insulator material such as, but not limited to, alumina silicate, alumina, or thermoplastics such as polytetrafluoroethylene (PTFE) and the like. The radial distance between the outer edges of the cathode, whether round or rectangular, and the insulator bore surface is preferably no more than 0.1 mm, such that favorable arc operation is maintained and the cathode 20 can slide along the axial direction, and rotate in the azimuthal directions inside the tubular insulator housing 21.

The wall thickness of the tubular insulator housing 21 is preferably on the order of 1 mm and its length more than 3 mm. These dimensions are selected as an engineering compromise, maintaining high ignition reliability while keeping acceptable lifetime. Lifetime is limited by ion sputtering of the insulator. The isolator length is also important in determining the anode 22 length. In order to maintain proper isolation between the pieces, the insulator tube 21 should be at least 1 mm longer than the length of the anode 22.

The tubular insulator 21 is fitted inside a hollow anode housing 22. The insulator 21 is fitted tightly to the anode 22 to prevent the insulator 21 from sliding with motion of the cathode 20 and providing good contact all around the aperture. This fitting can be achieved either by pressing the isolator 21 between two opposing anode pieces or by pushing the insulator 21 inside the anode 22 and locking it by friction, or the like. The anode 22 may be constructed of one of the conducting materials selected for the cathode 20. The anode 22 outer surfaces can be arbitrary shaped. A preferable configuration of the anode 22 has a square front profile with an edge length of about 8.5 mm, in order to fit inside the standard bar structure of a CubeSat class satellite.

All dimensions given in this detailed description section relate to an ISF-VAT configured for use in nanosatellites, such as a CubeSat class satellite, but it is to be understood that these dimensions can be amended for different purposed VATs.

For first time operation, before cathode material is ejected and provides recoating, discharge initiation is facilitated by application of a thin film conducting layer 23 on the outer surface interface (exit plane) between the cathode 20, insulator 21, and anode 22, as shown in FIG. 2.

The conductive layer 23 can comprise a metal or carbon. The electrical resistance of conductive layer 23 between the anode 22 and cathode 20 is preferably less than 100 kΩ. During breakdown, the porosity and the existence of small gaps in the conductive layer 23 generate micro-discharges that allow current to flow from anode to cathode to produce an arc. Once formed, the arc resistance is of the order of tens of milliohms, which is significantly lower than that of the initial thin film coating. After the first several arc ignitions the original coating material is eroded and is replaced with cathode material deposition. This process permits reliable continuation of ignitions over the entire lifetime of the thruster.

It is believed that in this configuration, the vacuum arc physics permits an almost unrestricted number of discharge ignitions as well as a near constant and predictable erosion rate, smoothing over any discharge variations due to localized deformations on the partially consumed cathode rod. Specifically, the initial conductive layer 23 on the insulator surface 21, that provides the finite resistance to allow the arc to be formed, is maintained even as the cathode rod 20 is advanced. This is not an expected result, since it might have been expected that:
(1) the conductive layer contact at the cathode-insulator surface would be broken by the cathode motion,
(2) the conductive layer on the insulator would be destroyed during the discharge, and
(3) the conductive layer on the anode-insulator interface would be destroyed during the discharge.

Each ignition pulse starts with a voltage spike of between 500-1200 V lasting a few microseconds. Following the voltage spike and the coating 23 breakdown, an arc discharge regime establishes, with typical voltages of Vout~20-40 V and discharge currents Iout~10-100 A. The discharge current Iout reaches its maximum value immediately after breakdown and declines until the arc is terminated, with a threshold value of a few amperes. In each pulse the arc duration is typically between 50-500 μsec. This technique of vacuum arc ignition and the PPU design are known from U.S. Pat. No. 6,818,853.

In the implementation of the ISF-VAT assembly 18, the anode 22 is connected to an extended metallic tubular housing 30 by an annular isolator 24. The annular insulator 24 electrically isolates the conducting tubular housing 30, which is at cathode potential, from the anode potential. This enables the conducting tubular housing 30 to be part of the outer structure of the ISF-VAT assembly 18. To prevent short circuits, the annular insulator 24 is preferably more than 1 mm in thickness and can be made from an insulator material such as that selected for the tubular insulator housing 21.

The eroded cathode material at the cathode-insulator interface position is constantly being replenished by a feeding mechanism. The feeding mechanism may exemplarily comprise an internal screw thread 35 on a segment of the inner surface of the conductive tubular housing 30. An externally threaded headless screw, or screw segment 26 is installed within the screw thread section 35 inside the conductive housing 30. The screw segment 26 should be constructed of a conductive material, so that it can maintain good electrical contact with the cathode 20. The cathode potential can then easily be applied via the conductive housing 30. The cathode 20 is attached axially in an axial bore inside the screw segment 26, and therefore rotates and moves axially with rotation and axial motion of the screw segment 26. The screw thread pitch and the rotation rate of the screw segment 26 are selected to allow uniform and complete erosion of the cathode at the exit plane. It is important to note that the feeding rate and therefore mass flow rate are matched to the input power and cathode diameter, where faster feeding rates are obtained by utilizing higher arc power and/or smaller diameter cathodes. The feeding rate and mass flow rate are proportional to the power level which is itself proportional to the pulse frequency. For a chosen material and cathode diameter the proportionality constant is determined by preliminary calibration tests. Operation parameters for a specific ISF-VAT configuration are given next. Utilizing a titanium cathode rod 1 mm in diameter and operating the thruster at 3 W of arc power, the cathode axial erosion rate is ~1 μm/s (a mass flow rate of $\sim 3 \times 10^{-9}$ kg/s). As the energy per pulse is typically ~0.1 J, the pulse frequency is set to 30 Hz. The cathode linear advance has to be matched to the axial erosion rate. Typically a screw pitch of 0.5-1 mm is selected and the cathode advance is controlled by varying the rotational rate of the screw.

By maintaining the specific thruster geometry shown in FIG. 2, namely a flush cathode, insulator, and anode, the feeding mechanism also allows a uniform re-coating of the insulator surface by eroded cathode material. This facilitates uninterrupted discharge ignitions and hence thruster operation. Given sufficient cathode material, thruster lifetime is only limited by insulator erosion and accumulation of conductive material on the insulator surface. Thruster life time depends on how precise the cathode tip is maintained at the exit of the insulator. Long life times, i.e. hundreds of thousands of firing pulses, can be achieved if the cathode tip position is well controlled and is kept at the edge of the insulator. If the cathode is underfed its tip will recede inside the insulator and may cause a thruster failure due to the mentioned effects, in the form of a short circuit between cathode and anode.

In order to operate the ISF-VAT of the type shown in FIG. 2, mechanical power is required to rotate the screw segment 26 so that the cathode 20 moves axially forward to the discharge region as it is consumed by the discharge. In the exemplary implementation shown in FIG. 2, this motion is provided by a power spring 27. Typically, the power spring 27 is constructed to be able to perform 10-20 rotations, this being the order of the number of threads over which the screw segment 26 will travel from its initial position, to its final position when the cathode material is completely consumed. The power spring 27 should be able to provide a torque of between 0.02-0.2 Nm, and this is applied to a rotary shaft passing through the power spring assembly. Alternatively, the rotational motion can be provided using an electromechanical or piezoelectric motor, or any other suitable rotation device having low or zero on-board power consumption.

In the implementation shown in FIG. 2, the screw segment 26 is not shown as rotated by being directly connected to the power spring 27, but rather by means of a shaft assembly 25, in the form of a fork with a single, double or more extended rods 25b, 25c, which pass through holes in the screw segment and along the length of the screw segment 26 in off-axis positions which match the positions of the rods. The rods of the fork continuously transfer rotational motion from the power spring 27 to the screw segment 26. The shaft assembly allows the screw segment 26 to rotate while sliding along the fork rods 25b 25c, performing, together with the cathode 20, a rotational and forward directed helical path inside the extended housing 30. The fork rods 25b 25c are loosely fitted inside the holes in the screw segment 26 to allow the screw to slide along the rods axial direction. The shaft assembly 25 can be made from either conductive or insulating material. The advantage of this rod drive arrangement is that it enables the entire device to be made shorter, since if a screw segment 26 were used directly attached to and driven by the rotational motion device, the screw segment 26 would have to be twice as long as the intended range of motion desired. In the present configuration, since the screw segment 26 slides along the driving rods 25b, 25c, the length of the internally threaded housing need be no longer than the extent of the desired axial motion.

Figure 3:
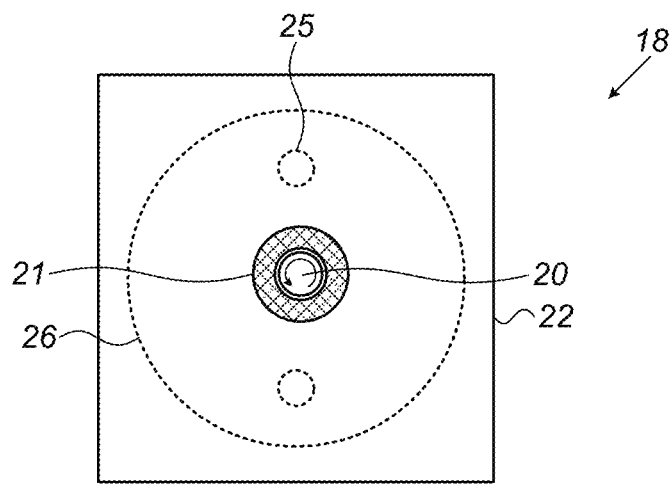
FIG. 3 is an end view from the exit plane of the ISF-VAT of FIG. 2.

Reference is now made to FIG. 3, which is an end view from the exit plane of the ISF-VAT of FIG. 2, showing how the rods 25b, 25c of the shaft assembly 25 pass through the cross-section of the screw segment 26, and transfer the rotational drive to the screw segment. The anode end plate 22 and outer housing of the device can be rectangular, as shown in FIG. 3 or circular, as implied in FIG. 2, so long as the inner surface of the housing, in which the screw segment 26 rotates, is circular to incorporate the internal thread.

In order to control the rotation rate of the power spring 27, as well as to start and stop its motion, in the implementation shown in FIG. 2, an amplified piezoelectric actuator or brake assembly 28 is used, operating on two disks that serve as the brake assembly 28a, 28b. As shown in FIG. 2, when powered, the actuator is in a contracted mode, causing the brake disk 28a attached to it to separate from brake disk 28b so that the brake disk 28b is free to rotate, allowing the power spring 27 to rotate the central shaft 25a of the fork assembly shaft, which is attached to the brake disk 28b.

Figure 4:
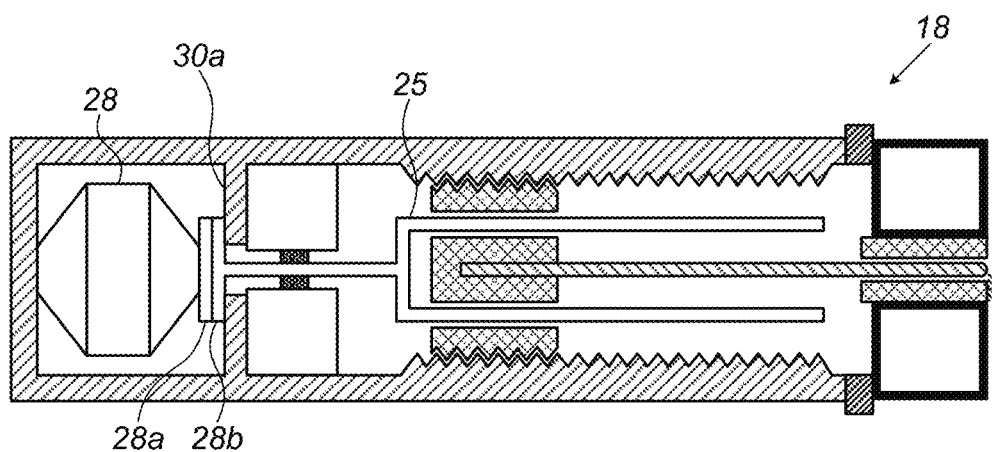
FIG. 4 shows the ISF-VAT of FIG. 2, with the rotation brake applied when the device is not generating thrust.

Reference is now made to FIG. 4, which shows how, in the implementation of FIG. 2, when the actuator assembly 28 is not powered, and the brake disks 28a, 28b are pressed against each other, forcing one of the disks 28b against a static disk 28a and/or against the extended housing wall 30a, therefore preventing the shaft assembly 25 from rotating. Since the feeding rate of the cathode is slow, it is generally only required to power the piezoactuator 28 for a small fraction of the lifetime of the device. Therefore the arrangement of having the actuator powered in order to release the brake when the cathode is advanced is the more power-efficient way of achieving this function. Due to the limited travel range of the piezoactuator, typically 50-100 micrometers, and the required assembly precision, brake discs 28a, 28b are preferably constructed from metal and their relative position can be regulated by an adjustment screw (not shown). The piezoelectric brake assembly 28 can be trimmed to its correct locked position when the actuator 28 power is off. It is to be understood however that any other suitable brake mechanism can be used for starting or stopping the transmission of rotational power to the screw segment 26.

Amplified piezoelectric actuators are advantageous for these applications for the following reasons:
1) their ability to generate relatively large forces on the order of several tens of Newtons; 2) very low power consumption ~0.1 W;
3) Sub-millisecond actuation time;
4) non-magnetic operation and proven to operate under space conditions; and
5) a relatively small footprint.

Electromechanical actuators can also be used instead of the preferred piezoelectric brake assembly 28. In the exemplary construction shown, the piezoelectric brake assembly 28 is secured to the thruster structure by a backplate 32. The backplate 32 also forms the back end of the tubular housing 30. The backplate 32 can be made from either conductive or insulating material.

Although the implementation of FIGS. 2 and 4 incorporate a braking mechanism which prevents rotary motion of the screw segment, it is to be understood that as an alternative rotation control system, it is possible to use a clutch assembly between the rotation generator and the shaft assembly.

EXAMPLE

The ISF-VAT implementation shown in this disclosure is a pulsed thruster that uses conductive cathode materials as a propellant together with an inductive energy storage system that requires input voltage Vin~10-30 V that converts the input power to the voltages and currents required by the vacuum arc pulse. The ISF-VAT has a thrust-to-power ratio of approximately from 2-10 μN/W providing small impulse bits ~1 μNs at specific impulse Isp (i.e., the exhaust velocity divided by the gravity constant g=9.81 m/s$^2$) between 400-1000 s. The mass of the PPU can be made less than 100 g, the mass of the thruster itself ~50 g being lower than that of the PPU, resulting in a low mass propulsion system. Thus the ISF-VAT is applicable as a main propulsion system for nanosatellites, whereas for larger spacecraft, it can be used as low power, low mass, and low volume fine attitude control and drag compensation system.

The above mentioned spacecraft missions typically require a total impulse bit of 1 Ns, therefore, the ISF-VAT has to be operated for long durations ~30 days and for a large number of pulses ~$10^6$-$10^7$. To achieve this life time requirement a feeding system must be used. The feeding system keeps a constant thruster geometry by advancing the cathode towards the exit plane, replenishing the eroded cathode material. For the considered thruster geometry with a cathode rod diameter of 1 mm and an erosion rate of approximately 1 μg/s, an initial cathode length of ~1-3 cm is required. Therefore, the ISF-VAT overall length is less than 10 cm, assuming the use of the proposed mechanical feeding system.

Figure 5:
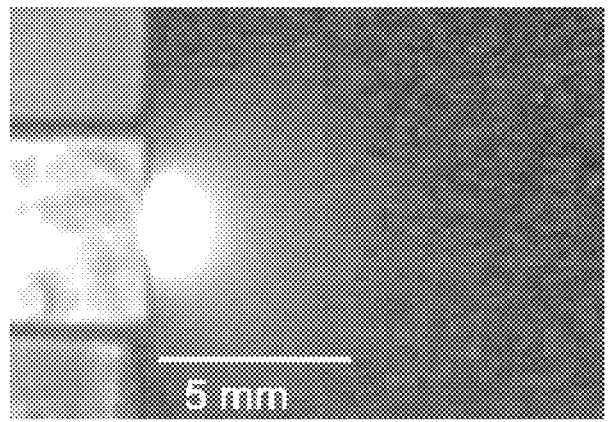
FIG. 5 is a photograph of a typical ISF-VAT plasma plume as generated by a single pulse.

Reference is now made to FIG. 5 which is a photograph showing a typical ISF-VAT plasma plume, from a side view, as generated by a single pulse. It is noted that the plasma plume is generated outside of the thruster assembly, on the exit plane directed away from the thruster. Typically, 50% of the metal ions are ejected over a half angle of 45°.

Figure 6B:
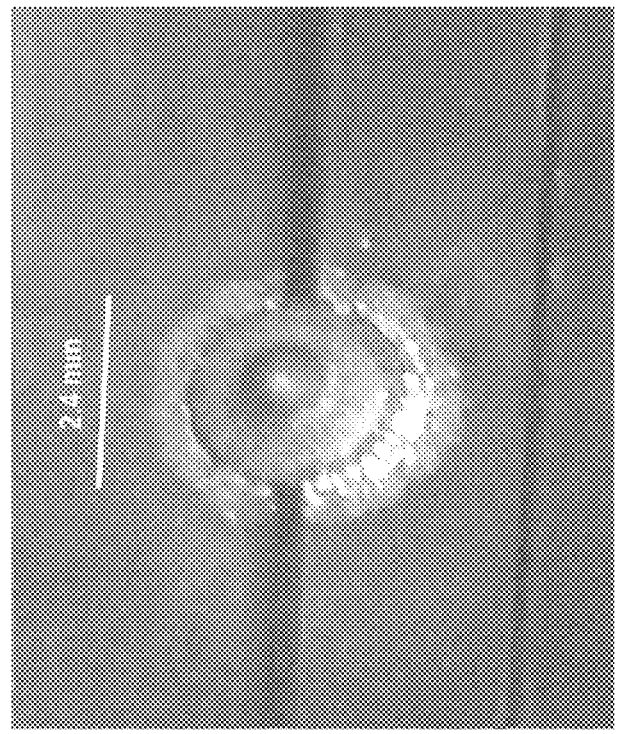
FIGS. 6a and 6b are photographs of an ISF-VAT exit plane surface after hundreds of thousands of firing pulses. The photographs display an ISF-VAT fitted with a 1 mm diameter titanium cathode inserted within a 2.4 mm diameter alumina insulator.
Figure 6A:
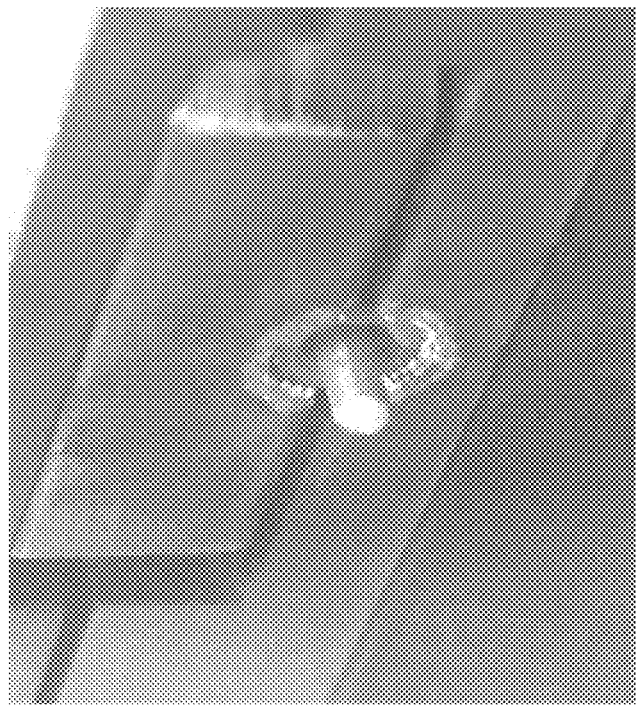

FIGS. 6a and 6b are photographs of the exit plane showing the erosion pattern that appears on the cathode tip and the material deposition on the insulator surface, after prolonged operation. FIG. 6a shows the cathode-isolator-anode interface surface with the cathode electrode in its operating position. In a color photograph, gray colored titanium deposition or re-coating is clearly observed on the insulator surface. This observation is important, as the original conducting layer used to start the discharge is eroded, and re-coating of the insulator by cathode material is required in order for the ignition process to continue.

In FIG. 6*b*, the cathode has been intentionally pulled out of the discharge plane distally, to show the symmetrical hemispherical-shaped erosion pattern of the cathode tip. The azimuthal uniformity of the erosion is clearly demonstrated.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A vacuum arc thruster assembly comprising:
   a housing having an anode at a distal end of said housing, insulated from said housing;
   an axial tubular insulator attached concentrically at a central region of said anode, said axial tubular insulator having an axial opening;
   a rod shaped cathode disposed within said axial opening of said axial tubular insulator, such that the rod shaped cathode is free to move axially and rotationally within said axial opening; and
   at least one mechanism adapted to generate rotational motion and axial motion of said rod shaped cathode, such that said rod shaped cathode rotates and moves distally within said axial tubular insulator,
   wherein said at least one mechanism comprises an internal thread formed in said housing, and said rod shaped cathode is fixed coaxially into a screw segment having an outer thread matching said internal thread of said housing, such that rotation of said screw segment causes said rod shaped cathode to rotate and to move distally within said axial tubular insulator.

2. The vacuum arc thruster assembly according to claim 1, wherein said at least one mechanism adapted to generate rotational motion and axial motion of said rod shaped cathode comprises a rotational motor generating rotational motion by direct rotation, and axial motion by rotation of said screw segment.

3. The vacuum arc thruster assembly according to claim 1, wherein said screw segment has at least one off-axis longitudinal opening, said vacuum arc thruster assembly further comprising a shaft assembly with at least one rod positioned off-axis such that the at least one rod fits freely into said at least one off-axis longitudinal opening, such that rotation of said shaft assembly rotates said screw segment by rotation of said at least one rod.

4. The vacuum arc thruster assembly according to claim 1, wherein said rotation of said screw segment is provided by at least one of the following rotating screw devices selected from the group consisting of a power spring, an electromechanical motor, a piezoelectric motor or a stepping motor.

5. The vacuum arc thruster assembly according to claim 1, further comprising a brake assembly for preventing rotation of said screw segment.

6. The vacuum arc thruster assembly according to claim 1, wherein said rod shaped cathode, axial insulator, and anode are essentially flush.

7. The vacuum arc thruster assembly according to claim 1, wherein said axial tubular insulator comprises a conductive film forming an anode-insulator-cathode interface.

8. The vacuum arc thruster assembly according to claim 7, wherein said conductive film is a metal or carbon.

9. The vacuum arc thruster assembly according to claim 1, wherein the vacuum arc thruster assembly is adapted to receive a pulsed voltage for application between said anode and said rod shaped cathode, the pulsed voltage has (i) an adjustable pulse frequency and (ii) an adjustable level, such that power input to said vacuum arc thruster assembly can be adjusted.

10. The vacuum arc thruster assembly according to claim 1, wherein the pitch of said internal thread and said outer thread is selected such that for a predetermined rate of rotation of said screw segment, and a predetermined power input, said rod shaped cathode moves distally within said axial tubular insulator at a same rate as a tip of said rod shaped cathode is eroded.

11. The vacuum arc thruster assembly according to claim 1, wherein for a given pitch of said internal thread and said outer thread, a power input and a rate of rotation of said rod shaped cathode are correlated such that said rod shaped cathode moves distally within said axial tubular insulator at a same rate as a tip of said rod shaped cathode is eroded.

12. The vacuum arc thruster assembly according to claim 9, wherein said pulsed voltage for application between said anode and said rod shaped cathode is received from a power unit comprising a voltage source, an inductor connected to the voltage source, and a switch connected to the voltage source and the inductor.

13. A vacuum arc thruster assembly comprising:
   a housing having an anode at a distal end of said housing, insulated from said housing;
   an axial tubular insulator attached concentrically at a central region of said anode, said axial tubular insulator having an axial opening;
   a rod shaped cathode disposed within said axial opening of said axial tubular insulator, such that the rod shaped cathode is free to move axially and rotationally within said axial opening; and
   at least one mechanism adapted to generate rotational motion and axial motion of said rod shaped cathode, such that said rod shaped cathode rotates and moves distally within said axial tubular insulator,
   wherein said at least one mechanism adapted to generate rotational and axial motion of said rod shaped cathode comprises a rotational motor and a linear motor.

14. The vacuum arc thruster assembly according to claim 13, wherein any of said rotational motor and said linear motor can be a piezoelectric, a stepping or an electromechanical motor.

15. The vacuum arc thruster assembly according to claim 13, wherein said rod shaped cathode, axial insulator, and anode are flush.

16. The vacuum arc thruster assembly according to claim 13, wherein said axial tubular insulator comprises a conductive film forming an anode-insulator-cathode interface.

17. The vacuum arc thruster assembly according to claim 16, wherein said conductive film is a metal or carbon.

18. The vacuum arc thruster assembly according to claim 13, wherein the vacuum arc thruster assembly is adapted to receive a pulsed voltage for application between said anode and said rod shaped cathode, the pulsed voltage has (i) an adjustable pulse frequency and (ii) an adjustable level, such that power input to said vacuum arc thruster assembly can be adjusted.

19. The vacuum arc thruster assembly according to claim 18, wherein said pulsed voltage for application between said anode and said rod shaped cathode is received from a power unit comprising a voltage source, an inductor connected to the voltage source, and a switch connected to the voltage source and the inductor.

20. The vacuum arc thruster assembly according to claim 13, wherein for a predetermined rate of rotation of said rotational motor, and a predetermined power input, said linear motor is adapted to move said rod shaped cathode distally within said axial tubular insulator at a same rate as a tip of said rod shaped cathode is eroded.

* * * * *